(12) United States Patent
Burchard et al.

(10) Patent No.: US 9,459,679 B2
(45) Date of Patent: Oct. 4, 2016

(54) POWER MANAGER AND METHOD FOR MANAGING POWER

(75) Inventors: Artur Tadeusz Burchard, Eindhoven (NL); Ger Kersten, San Jose, CA (US); Anca Mariana Molnos, San Jose, CA (US); Aleksander Milutinovic, San Jose, CA (US); Kees Gerard Willem Goossens, Eindhoven (NL); Elisabeth Francisca Maria Steffens, Eindhoven (NL)

(73) Assignee: Synopsys, Inc., Mountain View, CA (US)

( * ) Notice: Subject to any disclaimer, the term of this patent is extended or adjusted under 35 U.S.C. 154(b) by 958 days.

(21) Appl. No.: 12/992,478

(22) PCT Filed: May 12, 2009

(86) PCT No.: PCT/IB2009/051957
§ 371 (c)(1),
(2), (4) Date: Dec. 21, 2010

(87) PCT Pub. No.: WO2009/138953
PCT Pub. Date: Nov. 19, 2009

(65) Prior Publication Data
US 2011/0093734 A1    Apr. 21, 2011

(30) Foreign Application Priority Data
May 13, 2008    (EP) .................................... 08290448

(51) Int. Cl.
*G06F 1/26* (2006.01)
*G06F 1/32* (2006.01)

(52) U.S. Cl.
CPC .............. *G06F 1/3203* (2013.01); *G06F 1/26* (2013.01); *G06F 1/324* (2013.01); *G06F 1/3296* (2013.01); *Y02B 60/1217* (2013.01); *Y02B 60/1285* (2013.01)

(58) Field of Classification Search
CPC ..................................... G06F 1/00; G06F 1/26
USPC ................................. 713/300, 320, 322, 323
See application file for complete search history.

(56) References Cited

U.S. PATENT DOCUMENTS 4,823,292 A    4/1989  Hillion
6,574,739 B1 *  6/2003  Kung et al. ................... 713/322

(Continued)

FOREIGN PATENT DOCUMENTS

CN    1701297 A    11/2005
CN    1983120 A     6/2007

(Continued)

OTHER PUBLICATIONS

ISA/EP, PCT International Search Report and Written Opinion dated Aug. 28, 2009 in application No. PCT/IB2009/051957.

(Continued)

*Primary Examiner* — Khanh Dang
(74) *Attorney, Agent, or Firm* — Fenwick & West LLP (57) ABSTRACT

A power manager (106) and method for managing the power supplied to an electronic device is provided. Furthermore, a system wherein the power supplied to an electronic device is managed is provided. The power manager (106) is operative to monitor a hardware monitor (104) during a monitoring time period. The hardware monitor (104) is coupled to an electronic device (102). The electronic device (102) has a workload during operational use. The hardware monitor is operative to indicate the workload of the electronic device (102). The power manager is operative to control power supplied to the electronic device (102) in dependency on the monitoring.

15 Claims, 5 Drawing Sheets

(56) References Cited

U.S. PATENT DOCUMENTS

| | | | |
|---|---|---|---|
| 7,017,060 B2* | 3/2006 | Therien et al. | 713/323 |
| 7,219,245 B1 | 5/2007 | Raghuvanshi | |
| 7,685,446 B2* | 3/2010 | Hong et al. | 713/320 |
| 7,730,340 B2* | 6/2010 | Hu et al. | 713/323 |
| 7,904,287 B2* | 3/2011 | Lefurgy et al. | 703/21 |
| 8,245,057 B2* | 8/2012 | Lyu | 713/300 |
| 2005/0132238 A1 | 6/2005 | Nanja | |
| 2005/0216719 A1 | 9/2005 | Ma | |
| 2005/0273636 A1* | 12/2005 | Grobman | 713/322 |
| 2005/0289369 A1* | 12/2005 | Chung et al. | 713/300 |
| 2006/0031692 A1 | 2/2006 | Kato et al. | |
| 2006/0064691 A1* | 3/2006 | Blaisdell et al. | 718/100 |
| 2006/0123252 A1 | 6/2006 | Vaidya et al. | |
| 2006/0123253 A1* | 6/2006 | Morgan et al. | 713/300 |
| 2007/0016815 A1* | 1/2007 | Cooper et al. | 713/322 |
| 2008/0059968 A1 | 3/2008 | Cascaval et al. | |
| 2008/0098254 A1* | 4/2008 | Altevogt et al. | 713/600 |
| 2008/0270595 A1* | 10/2008 | Rolia et al. | 709/224 |
| 2009/0235062 A1* | 9/2009 | Vaidyanathan et al. | 713/1 |
| 2010/0023790 A1* | 1/2010 | Cooper et al. | 713/322 |

FOREIGN PATENT DOCUMENTS

| | | | |
|---|---|---|---|
| GB | 2 402 504 A | | 12/2004 |
| JP | H05-066560 U | | 9/1993 |
| JP | 2006-072991 A | | 3/2006 |
| JP | 2007-141020 A | | 6/2007 |

OTHER PUBLICATIONS

Chinese Third Office Action, Chinese Application No. 200980126357.1, Mar. 19, 2014, 7 pages.
Chinese Second Office Action, Chinese Application No. 200980126357.1, Aug. 26, 2013, 7 pages.
SGI, *Topics In Irix Programming, Chapter* 4, Silicon Graphics International Corp., Techpubs Library, Published Apr. 21, 2004, 16 pages.
Singhal, A. et al., "Architectural Support for Performance Tuning: A Case Study on the SPARCcenter 2000," ACM SIGARCH Computer Architecture News, Proc. of the 21st Annual International Symposium on Computer Architecture (ISCA 94), IEEE, Apr. 1994, pp. 48-59, vol. 22, No. 2.
Chinese Fourth Office Action, Chinese Application No. 200980126357.1, Sep. 24, 2014, 7 pages.
Chinese First Office Action, Chinese Application No. 200980126357.1, Mar. 12, 2013, 15 pages.
Korean Office Action, Korean Application No. 2010-7027886, Feb. 23, 2015, 8 pages.
Japanese Office Action, Japanese Application No. 2011-509072, Jun. 4, 2009, 7 pages.

* cited by examiner

POWER MANAGER AND METHOD FOR MANAGING POWER

FIELD OF THE INVENTION

The invention relates to a power manager.

The invention also relates to an electronic system comprising an electronic device.

The invention also relates to a method for managing the power supplied to an electronic device.

The invention also relates to a computer program product.

BACKGROUND OF THE INVENTION

In modern electronic devices, power management is becoming ever more important. For example, battery operated devices acquire more computationally intensive features, such as playing video clips. Such computationally intensive features require more power. Yet, at the same time there is a demand for longer stand-by and operating times. Also, for environmental reasons it is important not to needlessly dissipate power.

To reduce the energy use, i.e. the power consumption, of an electronic device, such as an integrated circuit (IC), Dynamic Power Management (DPM) is used. DPM is a technique that dynamically scales the power delivered to an electronic device to such a level that it just meets the varying performance levels required for an application using the electronic device.

The workload of an electronic device changes dynamically while the application is using the electronic device. To scale the power delivered to the electronic device the amount of power needed in the future needs to be predicted. As the future power needs of an electronic device are more accurately predicted, the more power can be saved.

One way of controlling the power for a computer running an application on top of an Operating System (OS) is based on the number of processor clock cycles that were spent in a particular task in the past. The number of clock cycles that were spent in a particular task is determined by the OS. The problem is that determining the number of cycles spent in a task is only triggered by some OS related events, for example, when switching tasks, or when an OS timer tick occurs. Determining the number of cycles spent in a task cannot be done more frequently, because the OS runs in software. As a result the resolution of the data produced by an OS is too low to identify patterns in the power consumption on a time scale with a finer granularity than that allowed by a software program, such as an OS.

SUMMARY OF THE INVENTION

It is a problem of the prior art that workload monitoring for power supply controlling is too inaccurate.

It is an object of the invention to improve the controlling of power supplied to an electronic device.

The object is achieved by a power manager according to the invention. The power manager is operative to monitor a hardware monitor during a monitoring time period. The hardware monitor is coupled to an electronic device. The electronic device has a workload during operational use. The hardware monitor is operative to indicate the workload of the electronic device. The power manager is operative to control power supplied to the electronic device in dependency on the monitoring.

When an electronic device is operative sometimes its workload is high and sometimes its workload is low. The power management of an electronic device could be improved if a better prediction could be made of its workload. In that case the supply of power to the electronic device can be reduced when its workload is low.

To predict the future workload of an electronic device, accurate data must be collected to base this prediction on. Such accurate data can be obtained from a hardware monitor. By basing power control on accurate data of the workload, a better control of the power supply is achieved. As a result the power to the device will be reduced, resulting in power savings. In case the device is battery operated, the batteries will drain slower.

Embodiments of an electronic device whose workload can be monitored include, e.g. an integrated circuit (IC), or an electro-mechanical device, such as a stepper motor. Examples of electronic devices also include computation devices or data handling devices, such as a video processing unit in a mobile phone, etc.

In particular, a central processing unit (CPU) operative to execute a computer program, i.e. software, is an electronic device. Also, when a CPU executes an application, such as a music application or video application, sometimes the workload of the CPU will be high and sometimes the workload will be low.

The workload can be a direct representation of the amount of work performed by the electronic device in a time period. For example, the workload can be the quotient of the number of productive cycles and the total number of cycles in a time period. The workload can also be the amount of power that is consumed by the electronic device.

During operation, the electronic device needs power. The amount of power needed by the electronic device depends on the operation the electronic device is carrying out. In normal operations, changing the power supplied to the electronic device influences only the speed with which the electronic device operates. Changing the power supplied to the electronic device operations does not, in itself, influence the operations performed by the electronic device.

The hardware monitor is operative to indicate the workload of the electronic device, at a fine-grained resolution. For example, for a clocked electronic device, the resolution may be on a per cycle basis.

If the electronic device is a CPU, the hardware monitor indicates, for example: if the CPU is currently executing a No Operation (NOP) instruction, if the CPU is in sleep mode or idle mode. Some models of CPU can go in to an idle mode by blocking their output buffer. The hardware monitor may monitor the blocking of an output buffer.

A typical example of a hardware monitor is a so called hardware event counter, also known as hardware performance counter, also known as Performance Monitoring Unit.

A hardware event counter is typically comprised in a processor, and is known in the art. Most modern processors offer hardware event counters for monitoring performance events related to the interaction of applications with special subunits of the processor. See for example: Intel Corporation. *Intel Architecture Software Developer's Manual. Volume 3: System Programming Guide*, 2004; SGI. *Topics In Irix Programming*, Chapter 4; A. Singhal and A. J. Goldberg. Architectural Support for Performance Tuning: A Case Study on the SPARCcenter 2000. ACM SIGARCH *Computer Architecture News, Proc. of the 21st Annual International Symposium on Computer Architecture* (ISCA 94), 22(2), April 1994; L. Smolders. PowerPC Hardware Performance Monitoring. Technical report, AIX Performance, IBM Server Group, November 2001; L. Smolders. *System* and *Kernel Thread Performance Monitor API Reference Guide*. IBM, RS/6000 Division, 2001.

Power may be controlled by moving a state machine to certain states. In particular, power may be controlled by turning off an idle electronic device.

Power can be controlled by changing the routing of the power supply. The power can also be controlled by instructing other units, e.g., a power controller, to reduce or increase the amount of power routed to the electronic device.

In a practical embodiment of the invention, the power manager is operative to control the power by controlling the clock frequency on a clock line connected to the electronic device.

In a practical embodiment of the invention, the power manager is operative to control the power by controlling the supply voltage of the electronic device.

The invention is particularly advantageous if the workload is substantially periodic.

If the workload is periodic the prediction of future workload is simplified. For periodic workloads the past is a good indication of the future. If it can be detected that the application is, or currently is, periodic the prediction of the workload can be improved.

A problem with obtaining workload numbers using the OS is that it only gives a CPU workload number, e.g., in a percentage. A power manager, using such a number cannot determine when a new period of high workload begins, nor can the power manager determine what the frequency or time period of a workload's repetition is. Detecting the exact time period or exact period's phase, is not possible using OS based numbers.

The power manager may operate as follows: detecting a workload frequency of the periodic workload, e.g., detect the time that elapses between a first and a second workload period; detecting a workload phase in the periodic workload, e.g., find the point in the periodic workload where the load starts.

In a preferred embodiment of the invention the power manager is operative to detect a rising edge in the monitored indicated workload and the power is controlled in dependency on the detected rising edge.

By signaling a sudden rise, i.e. a rising edge, in the workload of the electronic device, the beginning of a period of high workload can be detected. To detect an edge the edge detection must be based on accurate data.

Signaling a sudden rise is detected, e.g., as follows: the value indicated by the hardware monitor rises at least a predetermined percentage in a predetermined length of time; the value of the hardware monitor rises at least a predetermined amount in a predetermined length of time; the fraction of the time the hardware monitor indicates values above a certain value increases in a predetermined time period.

Signaling a sudden rise can also be done by first calculating a running average of the measurements of the hardware monitor, and second detecting a sudden rise in the running average. The latter technique is especially useful if the hardware monitor reports binary values.

In a practical embodiment of the invention, the power manager is operative to detect a falling edge in the monitored indicated workload; the power is controlled in dependency on the detected falling edge.

By signaling a sudden decrease, i.e. a falling edge, in the workload of the electronic device, the end of a period of high workload can be detected. To detect an edge, the edge detection must be based on accurate data.

In a practical embodiment of the invention, the power manager is operative to detect a further rising edge in the monitored indicated workload; the power manager is operative to predict a future edge in dependency on the difference between the rising edge and the further rising edge; the power is controlled in dependency on the predicted future edge.

When at least two rising edges have been determined, a prediction can be made, by extrapolating, when a future edge will occur. For example, a future edge can be predicted for the time of the further rising edge plus the difference in time between the occurrences of the further rising edge and the rising edge.

The power can be controlled in dependency on the predicted future edge, by setting the level of supplied power to a level needed in the time interval just after the past edges.

In a practical embodiment of the invention, the power manager is operative to detect a further falling edge in the monitored indicated workload; the power manager is operative to predict the future edge in dependency on the difference between the falling edge and the further falling edge; the power is controlled in dependency on the predicted future edge.

When at least two falling edges have been determined, a prediction can be made, by extrapolating, when a future edge will occur. For example, a future edge can be predicted for the time of the further falling edge plus the difference in time between the occurrences of the further falling edge and the falling edge.

The power can be controlled in dependency on this predicted future edge, by reducing the level of the supplied power to a level needed in the interval just after past falling edges.

In preferred embodiment of the invention, the power manager is operative to select a next monitoring time period adjusted around the predicted future edge; the power manager is operative to monitor the hardware monitor during the next monitoring time period.

Once the power manager can predict a future falling or rising edge, the power manager may decide to stop continuous monitoring. By selecting a next monitoring time period, wherein a predicted edge falls, the power manager can verify if its predictions are correct. There is no need for the next monitoring time period to contain the immediately following predicted edge, instead, the power manager may skip one or more predicted edges before monitoring again. Measuring from time to time may be useful to correct for a drift in the occurrence of the edges.

In a practical embodiment of the invention the power manager is operative to produce a monitoring trace for tracking the hardware monitor; the power manager is operative to determine a workload frequency in the workload and a workload phase with respect to a reference time point, based on the monitoring trace; the power manager is operative to predict the workload based on the workload frequency and the workload phase; the power is controlled in dependency on the predicted workload.

A monitoring trace is a recorded representation of a history over a time period of the values indicated by the hardware monitor.

The power manager can create a trace by temporarily storing a number of values produced by the hardware manager. The trace can be analyzed too, for periodic patterns, for example, by detecting edges. Such periodic patterns have a frequency, i.e. workload frequency. A point where a period of high workload starts can be determined with respect to a reference point, i.e. the workload phase.

Once it is known when a period of high workload starts and how often the period repeats, the future workload can be predicted.

In a practical embodiment of the invention the hardware monitor is integrated in the power manager.

The electronic system according to the invention comprises a power manager according the invention and an electronic device having a workload during operational use; and a hardware monitor coupled to the electronic device and operative to indicate the workload of the electronic device.

In a preferred embodiment of the system according to the invention the electronic system is configured for having the workload substantially periodic.

An electronic system according to the invention can be accommodated in an electronic mobile data handling device.

It is a problem that the operational use of electronic mobile data handling devices are constrained by their power needs. It is particularly advantageous to reduce the power consumption of an electronic mobile data handling device. Reducing the power consumption of a device will give the device, e.g., a longer standby time and/or a longer playing time.

Embodiments of an electronic mobile data handling device include a mobile phone, a personal digital assistant (PDA), an mp3 player, a portable video playing device, a personal navigation device, etc.

The method for managing the power supplied to an electronic device, comprises the following steps: monitoring a hardware monitor during a monitoring time period; controlling power supplied to the electronic device in dependency on the monitoring.

In a preferred embodiment of the method for managing the power supplied to an electronic device a representation of the monitoring is stored in a monitoring trace. The method comprises the additional steps of: detecting at least two edges in the monitoring trace; determining a workload frequency and a workload phase with respect to a reference time point, based on the monitoring trace; predicting the workload based on the workload frequency and workload phase. The controlling is carried out in dependency on the predicting.

A preferred embodiment of the method for managing the power supplied to an electronic device comprises the following steps: predicting a future edge; selecting a next monitoring time period adjusted around the predicted future edge; monitoring the hardware monitor during the next monitoring time period.

The computer program product comprises computer code for performing the method according to the invention.

It is to be noted that the paper by Christos D. Antonopoulos and Dimitrios S. Nikolopoulos, "Using Hardware Event Counters for Continuous, Online System Optimization: Lessons and Challenges" discloses a method for using hardware event counters to adapt the scheduler of an operating system (OS).

It is to be noted that U.S. Pat. No. 4,823,292: "Data processing apparatus with energy saving clocking device", incorporated herein by reference, discloses a data processing apparatus, having a data processing element with an operating mode and a stop mode. The energy consumption of the device can be reduced, by switching between the two modes. U.S. Pat. No. 4,823,292 does not make use of a hardware monitor.

BRIEF DESCRIPTION OF THE DRAWINGS

The invention is explained in further detail, by way of example and with reference to the accompanying drawing, wherein.

Throughout the Figures, similar or corresponding features are indicated by same reference numerals.

List of Reference Numerals:
100 an electronic system
102 an electronic device
104 a hardware monitor
106 a power manager
200 a Power Management Unit (PMU)
202 a workload frequency and workload phase detector
204 a workload predictor
206 a workload frequency transport
208 a workload phase transport
210 a workload transport
500 a trace generator
502 a power manager logic
508 a power controller
510 a Dynamic Voltage and Frequency Scaling (DVFS) Driver
512 an application memory
1002 monitoring a hardware monitor (104) during a monitoring time period and store in a monitoring trace;
1004 detecting at least two edges in the monitoring trace;
1006 determining a workload frequency and a workload phase with respect to a reference time point, based on the monitoring trace;
1008 predicting the workload based on the workload frequency and workload phase;
1010 controlling the power supplied to the electronic device in dependency on the predicting.

DETAILED DESCRIPTION OF THE EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
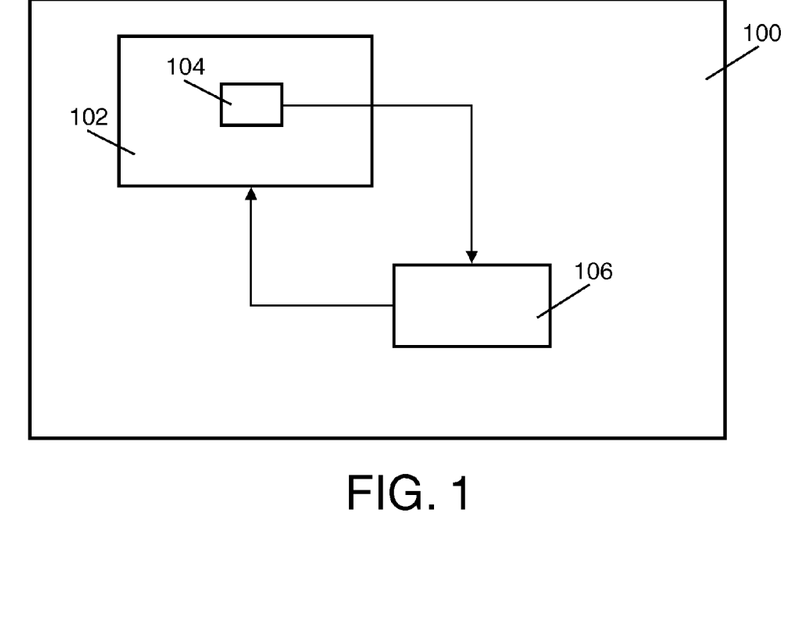
FIG. 1 is a block diagram showing an embodiment of an electronic system according to the invention.

In FIG. 1 a block diagram is shown of an embodiment of an electronic system (100) according to the invention.

The system (100) comprises an electronic device (102), a hardware monitor (104) and a power manager (106). In this embodiment the electronic device (102) comprises the hardware monitor (104), although this is not necessary.

The hardware monitor (104) is configured to indicate the workload of the electronic device (102). The power manager (106) is arranged to be able to read the hardware monitor (104) via a connection. The power manager (106) is arranged to control the power supplied to the electronic device (102).

During operation, the hardware monitor (104) indicates values that represent the workload of the electronic device (102). For example, the hardware monitor (104) may be a one bit register indicating if the electronic device (102) is currently active or idle. The power manager (106) reads the contents of the hardware monitor (104) and uses it to predict the future workload of the electronic device (102). Based on the future workload of the device (102), the power manager (106) decides the amount of power needed by the electronic device (102). For example, the power manager (106) may calculate the clock frequency needed by a processor to finish the workload in time; the power manager (106) can calculate a supply voltage that is just sufficient to sustain the clock frequency.

The electronic device (102) has a periodic workload. The hardware monitor (104) is coupled to the electronic device (102) and indicates the workload of the electronic device (102). The power manager (106) monitors the hardware monitor (104). The power manager (106) makes a prediction of the future workload and on the basis of the prediction, the power supplied to the electronic device (102) is regulated.

The power manager (106) makes the workload period prediction by means of detecting edges. The power manager (106) synchronizes its operation with the detected workload periods. The power manager (106) determines the start of a rising edge, and the frequency of rising edges. Ideally also the length of the workload period is calculated.

The power manager (106) does not need to continuously monitor the hardware monitor (104). Once the power manager (106) has predicted an edge, the power manager (106) will only monitor in a time interval around the moment of occurrence of the predicted edge to check its prediction, and to calibrate, i.e. re-adjust, if necessary. Re-adjustment may be necessary in case of drift.

The power manager (106) can be made using dedicated hardware, such as electronic circuits that are configured to perform the controlling and monitoring, or the power manager (106) can be made from generic hardware controlled using dedicated software, or the power manager (106) may comprise a combination of dedicated hardware and generic hardware.

Typically, the power manager (106) will control the power through an intermediate, power management unit (200) (not shown in FIG. 1), e.g., by sending information about clock frequency and/or supply voltage to the power management unit (200).

Instead of reporting the workload of each cycle, the hardware monitor (104) may report the workload in a short time period combined in a single number, e.g. the average or total workload. For example, the hardware monitor (104) may report the number of active cycles of a CPU in a short time period. A time period is short if the resulting combined values given by the hardware monitor (104) give sufficient resolution to view the periodicity of the workload.

Figure 2:
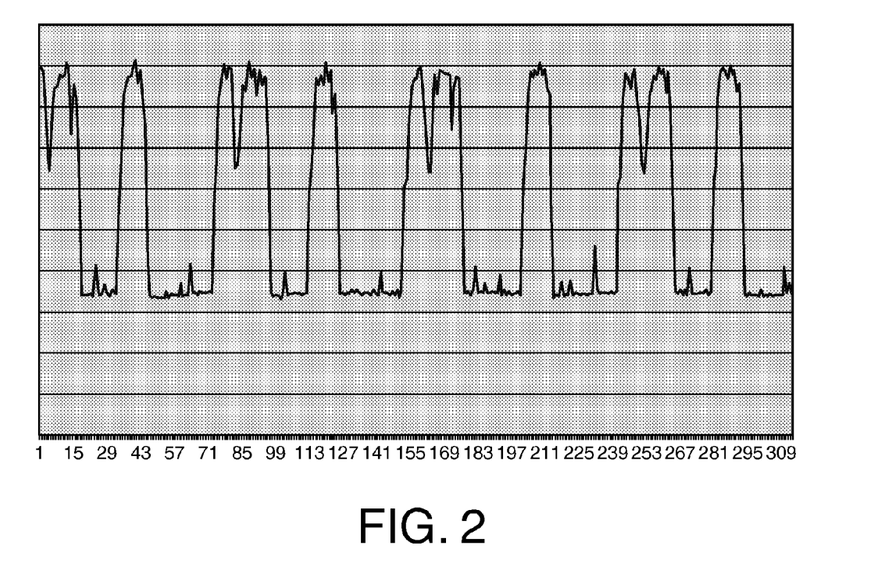
FIG. 2. is a graph showing a workload trace of a periodic application.

In FIG. 2 a graph is shown of a workload trace of a periodic application. The graph shows an example workload trace, for a periodic application, namely video decoding, running on embedded ARM9 CPU.

In order to predict processor workload of a periodic application, with a varying workload, e.g. a varying number of active CPU cycles needed per period, a correct measurement of the workload for the current period has to be performed.

Measuring this workload during the correct time frame, e.g., one period, in software or, e.g., an operating system, is not possible with sufficient time resolution. When using hardware event registers or trace registers that measure CPU occupation on a very fine grain, a more precise synchronization is possible. In the invention, application workload is measured by an independent observer. Ideally, the period of the measurement is equal to the workload period, and the beginning of the measurement period is synchronized with the beginning of the workload period.

For applications that are not CPU-bound, i.e. which do not require a constant CPU workload of around 100%, power consumption can be reduced by running the CPU at a clock frequency and voltage that is just adequate to perform the requested computation in time. The CPU workload can be computed as the fraction of the time the CPU is busy executing instructions, or alternatively, as a ratio of a number of clock cycles used for computation to the total number of available clock cycles for a defined period.

The controlling of the power supplied to the CPU can be done, e.g., via control of the clock frequency and/or voltage. For example, power can be controlled through the use of Dynamic Voltage and Frequency Scaling (DVFS) which may be controlled from software and/or from hardware.

For periodic applications, like video playback, it is possible to control power supplied to the CPU, by observing and predicting the workload of the CPU.

In operating systems, such as Linux, the CPU workload is measured by the OS. In Linux this is done by the timer tick interrupt: at each timer tick, typically each 1, 4 or 10 milliseconds (msec), the CPU is interrupted and the code that was interrupted is classified. The code class is one of the following types: User, System, Nice or Idle. The type "User" stands for running applications, System means executing a system call. The type "Nice" stands for batch jobs being processed. And the type "Idle" means the CPU is not performing any useful instructions, e.g., the CPU might be halted. At each timer tick, one unit value is added to the value counted by the corresponding class counter. To determine the workload during a certain period, consisting of several timer ticks, the sum of ticks spent in "User", "Nice" and "System" has to be divided by the total number of ticks in this period to get the CPU workload during this period. Typically the timer tick frequency is between 100 to 1000 Hz. Since the timer tick frequency is rather low, compared to the CPU speed, measuring workload is a trade-off between timing and value accuracy, e.g., measuring during 10 ticks yields a 10% accurate value every 10 timer ticks; for 1% accuracy the measuring period should be some 100 timer ticks, meaning a measuring period of 100, 250 or 1000 msec, much longer than, e.g., the frame rate for video playback. As a result these workload numbers reported by operating system software are insufficient for fine-grained power supply control.

Most modern microprocessors are equipped with special, on-chip hardware, e.g., hardware event counters, that can monitor performance events related to the interaction of applications with specific subunits of the processor. The results of performance monitoring are written to registers that allow analyzing the performance of various parts of the CPU core.

These hardware event counters give a hardware-based measure of processor workload with a greater accuracy and/or sampling resolution than is possible in software. These counters operate in the CPU clock frequency domain, which is in the order of nanoseconds, rather than in the OS timer tick domain. Since the workload frequency is necessarily lower than the CPU clock frequency, the sampling frequency of the hardware monitor can be kept sufficiently high to detect workload periods. The registers can be programmed to operate fairly autonomously, this gives the advantage that processor workload can be measured with greater timing accuracy and without noticeable performance impact on the CPU.

For instance, the Intel Pentium4 processor has 44 trace (event) registers of which 18 can be selected to provide real-time performance data, that measure. For example, a register can monitor: cache hits, branch prediction logic efficiency, and the time during which the processor is not idle. The time that the processor is not idle is a direct equivalent of the processor workload and is measured with a much higher time resolution than an operating system could do. The resolution of the hardware event counter is in the order of nanoseconds compared with the millisecond range of the OS. The CPU can autonomously output trace data values to main memory and generate an interrupt when certain events, such as counter overflow, occur.

Figure 3:
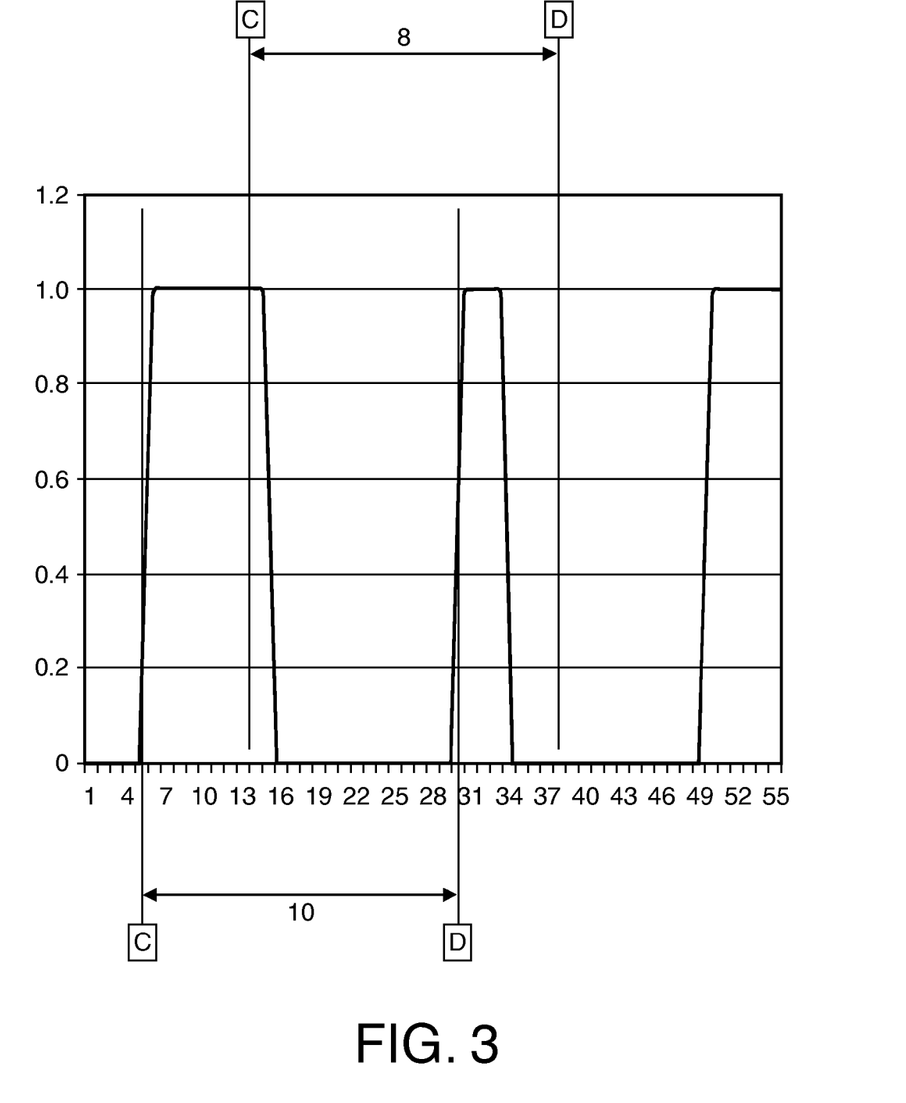
FIG. 3. is a graph illustrating the importance of determining a correct workload phase.

In FIG. 3, a graph is shown illustrating the importance of determining a correct workload phase.

In order to correctly predict the CPU workload, the current CPU workload must be known. For accurate workload measurements two characteristics of the application are needed. The first characteristic relates to the frequency of the workload variation, i.e. the workload frequency. Instead of the workload frequency, a value that is representative for the workload frequency can be used, e.g., the length of the period. For example, the workload frequency of a video playback application depends on the frame rate. The second characteristic relates to the workload phase of the workload, i.e. the start time of a repeated period of high workload of the application. For example, for a video playback application the workload phase would typically correspond to the start of the processing of a video frame.

These characteristics can be derived by observing the workload of the CPU. For this purpose, the CPU workload must be measured.

The graph of FIG. 3 is a detail of the workload graph of a periodic application. The problem involved in trying to control power, e.g., by predicting the workload of an application with a separate independent power manager (106), is that both the workload frequency, i.e. the frequency of the periodicity of the application, and the workload phase, that is the start time of a period, of the workload of the application are not known beforehand.

Even if the workload frequency is discovered, detecting the workload phase is important for a correct measurement of the workload. The graph shown in FIG. 3, illustrates the importance of synchronization of the measurement period with the workload period.

First the workload is measured during a correct period, that is between 'A' and 'B', which lasts 25 cycles, from 5 till 30. The workload value measured is 10 cycles, or 10/25*100%=40%.

Next, suppose that the measurement is not properly synchronized with the workload period. For example, the measurement takes place between 'C' and 'D', which also lasts 25 cycles, from 13 to 38. This results in an incorrect value for the workload, namely 8, or 8/25*100%=32%, which is quite off.

Using the measurement obtained from the wrong period, results in supplying the CPU with too little power. As a result, the system (100) could malfunction.

By detecting a sharp rise in the workload fast enough, a workload predictor (204) can synchronize its prediction of the workload with the actual workload periods of the application.

Figure 4:
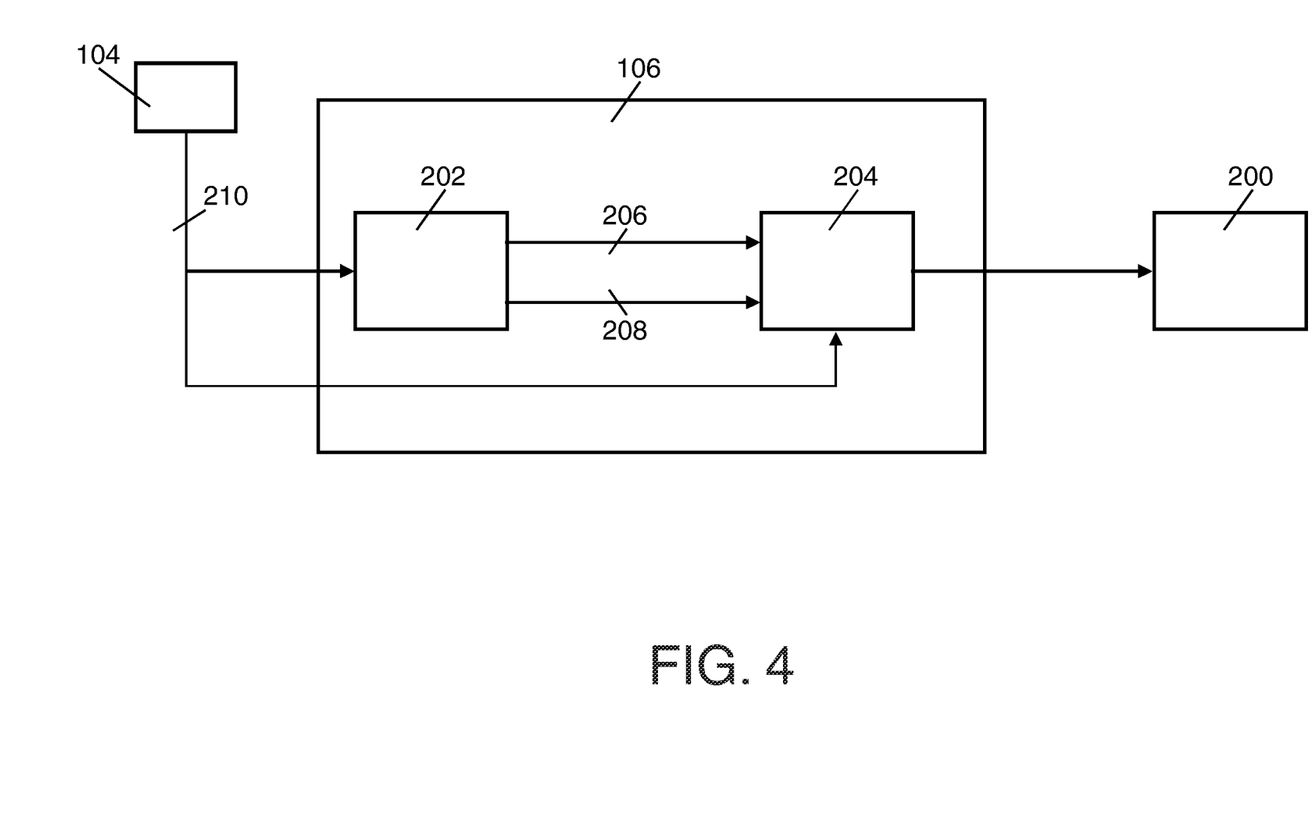
FIG. 4. is a block diagram showing an embodiment of a power manager

In FIG. 4, a block diagram is shown of an embodiment of a power manager (106).

The power manager (106) comprises a workload frequency and workload phase detector (202) and a workload predictor (204). The workload frequency and workload phase detector (202) is connected to the hardware monitor (104) for monitoring the hardware monitor (104). The signal representative of the workload is transported via a workload transport (210) from the hardware monitor (104) to the detector (202). The detector (202) estimates a workload frequency and a workload phase of the workload. If the detector (202) finds that the workload is not sufficiently predictable, the detector (202) disables the controlling of the power by the power manager (106).

Values obtained via the hardware monitor (104) can also be used by the workload predictor (204), via transport (210).

The detector (202) is connected to the workload predictor (204) via a workload frequency transport. The detector (202) is connected to the workload predictor (204) via a workload phase transport (208). The workload predictor (204) is configured for predicting the workload of the electronic device (102) on the basis of the workload frequency and the workload phase.

The workload predictor (204) determines on the power needed by the electronic device (102) on the basis of its predictions. The workload predictor (204) sets a frequency and a level of supply voltage and forwards these values to a Power Management Unit (PMU) (200). The unit (200) is configured for controlling the power supplied to the electronic device (102), in dependency on the information forwarded to it by the workload predictor (204).

The Power Management Unit (PMU) (200) sets a supply voltage based on the Low Drop Out (LDO) Regulator, a DC/DC inductance voltage regulator, or any other suitable voltage regulator. The unit (200) may also comprise a clock generation unit (CGU). The CGU generates a clock based on a PLL, DDS or divider method, or other suitable clock generation method.

In order to have a workload predictor (204) independent of the application causing the workload, and such that a workload measuring period is equal to a workload period, and that both periods are in phase, it is advantageous to have workload frequency and workload phase detection as intermediate steps in the prediction.

Workload frequency and workload phase detection can be done by detecting edges in the workload values reported by the hardware monitor (104). This depends on the fine granularity, i.e. high frequency sampling, of the workload monitoring mechanisms, including the hardware monitor (104). The fine granularity can be obtained using, e.g., hardware performance counters that measure workload with a high resolution.

The fine granularity is important for precise determination of workload periods, for workload frequency calculation, and for detection of the workload phase. The workload phase is also important for synchronization of measurement periods with workload periods.

The frequency with which the workload is sampled by the hardware monitor (104) should be higher, preferably much higher, than the frequency of the workload periods. In particular, the sampling of the workload should be frequent enough to detect a rising edge of the measured workload.

Determination of a workload period, of a workload frequency and of a workload phase can be done using any suitable edge detection mechanism.

Ideally, the workload measurement period and workload period are synchronized through a synchronization mechanism.

The power manager (106) can be implemented in a software application. The power manager (106) can run in parallel to, and independent of, other applications on the device (102).

Figure 5:
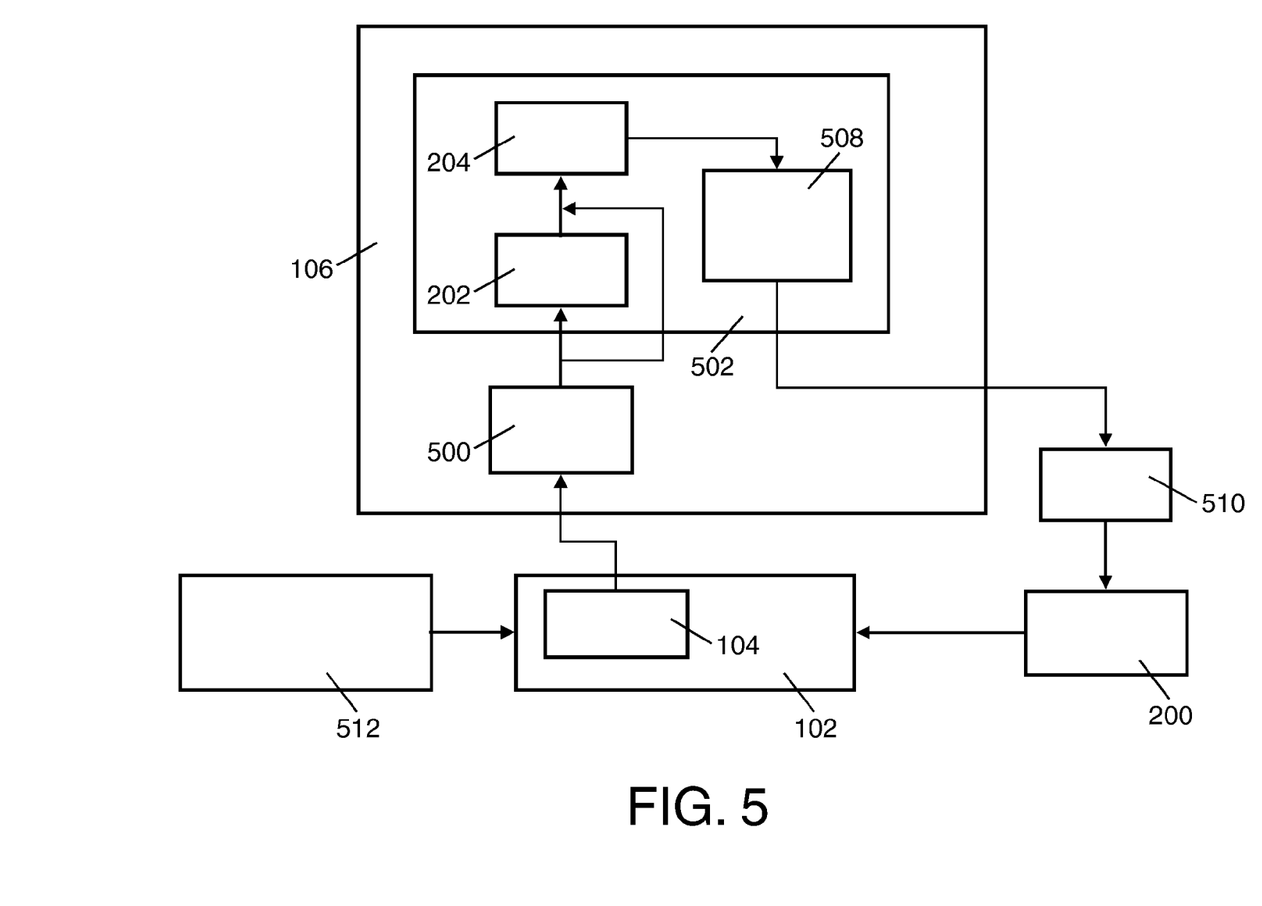
FIG. 5. is a block diagram showing a further embodiment of an electronic system according to the invention.

In FIG. 5, a block diagram is shown of a further embodiment of an electronic system (100) according to the invention.

The system (100) comprises an electronic device (102). The electronic device (102) comprises a hardware monitor (104). The device (102) is connected to an application memory (512). The electronic device (102) is operative to execute an application, i.e. software, residing in the application memory (512). The system (100) comprises a power manager (106). The power manager (106) is partly implemented in power manager logic (502) and partly in a trace generator (500).

The power manager logic (502) comprises a workload frequency and workload phase detector (202), a workload predictor (204) and power controller (508).

The trace generator (500) is connected to the hardware monitor (104). The trace generator (500) is configured for transporting the values reported by the hardware monitor (104) in the form of a trace to detector (202). A trace may be represented as an array of values. The trace generator (500) can comprise a buffer, such as a First In First Out (FIFO) buffer or a circular buffer. The trace can be transported to detector (202) and/or predictor (204) by making the contents of the buffer available to the detector (202) and/or predictor (204).

The detector (202) determines a workload frequency and a workload phase, on the basis of edges detected in the traces. The workload frequency and the workload phase are transported to the workload predictor (204). The workload predictor (204) predicts the future workload of the electronic device (102). The predicted workload is reported to the power controller (508). The power controller (508) determines the amount of power that needs to be supplied to the electronic device (102) in a next period, by determining a clock frequency and a supply voltage level. The clock frequency and supply voltage, are forwarded to a Dynamic Voltage and Frequency Scaling (DVFS) Driver (510). The driver (510) is capable of setting the clock frequency and the supply voltage in the Power Management Unit (PMU) (200). The unit (200) is capable of setting the clock frequency and supply voltage of the electronic device (102).

The driver (510) is optional in this embodiment, the power controller (508) could also directly set the clock frequency and supply voltage in the Power Management Unit (PMU) (200).

This embodiment is especially suitable for, at least a partial implementation in power logic software. In particular, the power manager logic (502) and its components can be implemented in software. The software can be run on a CPU. Possibly the electronic device (102) is a CPU that could, among other tasks, execute the power logic software. The power logic software could also run on a CPU independent of the electronic device (102). The power logic software may reside in a memory, such as the application memory (512), or a different memory.

Alternatively, the power manager logic (502) could be implemented in hardware, such as in an IC, e.g. a CMOS circuit, or any other suitable electronic circuit.

An example of an electronic system (100) is a machine with a Pentium 4 processor running Linux. The trace generator (500) reads out the event and/or trace register (104) of the CPU (102) and generates a trace. The workload frequency and workload phase detector (202) detects rising edges in the workload, like the edges A and B in FIG. 3. Preferably, the trace registers are set to measure processor occupation, for example, by monitoring trace the register 'global_power_events', on a regular basis. For this monitoring the application perfmon2 might be used, which is a hardware-based performance monitoring interface for Linux.

The power manager (106) is configured to initially synchronize with the detected workload edges. When the power manager (106) is synchronized with the detected workload edges, the power manager (106) can skip one or more workload periods before measuring again.

The workload values measured are forwarded to an edge detector. When the hardware monitor (202) and the edge detector (202) are both implemented in hardware, the edge detector (202) may interrupt the CPU on a detected rising edge. The predictor (204) can then precisely determine when a workload period starts. In this case the predictor (204) may be executed in software. This can be used to synchronize the workload phase of the first workload measurement. The workload period duration could be used to synchronize the measurement period. It could also be repeated from time to time to avoid drift between the measurement period and the workload period. On the other hand, the workload phase could be synchronized on every workload period. The latter is especially useful in case of high jitter in the workload period.

The invention is applicable in any system (100) that uses a microprocessor that, at least occasionally, runs periodic applications, or at least predictable applications.

Figure 6:
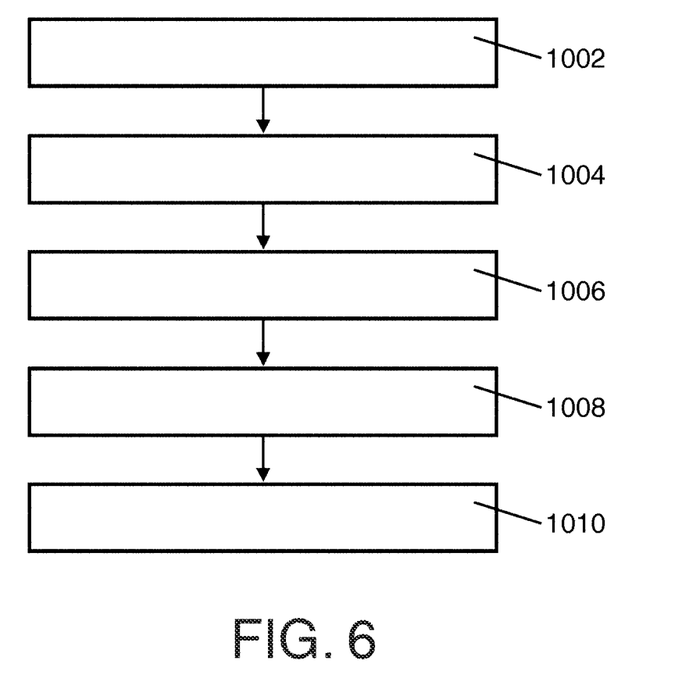
FIG. 6. is a flow chart illustrating a method according to the invention.

In FIG. 6 a flowchart a method according to the invention is illustrated. The method comprises the following steps.

In a first step (1002), a hardware monitor (104) monitors during a monitoring time period and stores the results in a monitoring trace. In a next step (1004), at least two edges in the monitoring trace are detected. In a next step (1006), a workload frequency and a workload phase are detected, with respect to a reference time point and based on the monitoring trace. In a next step (1008), the workload is predicted based on the workload frequency and workload phase. In a next step (1010), the power supplied to the electronic device (102) is controlled in dependency on the predicting.

The present invention, as described in embodiments herein, may be implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping, enhancements and variations can be added without departing from the present invention. Such variations are contemplated and considered equivalent.

The present invention could be implemented using special purpose hardware and/or dedicated processors. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

Those skilled in the art will appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

The invention claimed is:

1. An electronic system comprising:
    a hardware monitor coupled to an electronic device and configured to monitor a workload of the electronic device and to generate a signal indicative of the workload of the electronic device during a monitoring time period between a first time and a second time; and
    a power manager coupled to the hardware monitor and configured to:
        determine a frequency of a periodicity of the workload based on the signal,
        detect a first event in the workload at the first time, the first event represented by at least a first predetermined amount of change in the signal from a first level in a first predetermined length of time,
        detect a second event in the workload at the second time after the first time, the second event represented by at least another first predetermined amount of change in the signal from the first level in the first predetermined length of time,
        predict a third time at which a future event in the workload is expected to occur based on a difference between the first time and the second time,
        predict a fourth time after the third time, the fourth time corresponding to a predicated time when another future event in the workload is expected to occur based on the difference between the first time and the second time,
        select a subsequent monitoring time period between the third time at which the predicted future event is expected to occur and the fourth time at which said another predicted further event is expected to occur, the difference between the first time and the second time different from another difference between the third time and the fourth time, and
        control an amount of power supplied to the electronic device based on the frequency of the periodicity of the workload,
    wherein the hardware monitor is further configured to monitor the workload of the electronic device during the subsequent monitoring time period.

2. The electronic system of claim 1, wherein the power manager is further configured to detect a third event in the workload represented by at least a second predetermined amount of change in the signal to the first level from a second level in a second predetermined length of time.

3. The electronic system of claim 2, wherein the power manager is further configured to determine a number of unit cycles in the second level between the first event and the third event to predict the future event and said another future event.

4. The electronic system of claim 1, wherein the first event is represented by at least the first predetermined amount of change in the signal from the first level to a second level higher than the first level.

5. The electronic system of claim 1, wherein the power manager is further configured to:
    produce a monitoring trace representing a history of the signal from the hardware monitor, and wherein the first event and the second event are detected using the monitoring trace.

6. The electronic system of claim 1, wherein the hardware monitor is integrated in the power manager.

7. The electronic system of claim 1, wherein the workload is substantially periodic.

8. The electronic system of claim 1, wherein the hardware monitor is further configured to skip monitoring one or more events of the electronic device occurring between the monitoring time period and the selected subsequent monitoring time period.

9. A method for managing power supplied to an electronic device, the method comprising:
    monitoring, during a monitoring time period between a first time and a second time, a workload of the electronic device to generate a signal indicative of the workload;
    determining a frequency of a periodicity of the workload based on the signal;
    detecting a first event in the workload at the first time, the first event represented by at least a first predetermined amount of change in the signal from a first level in a first predetermined length of time;
    detecting a second event in the workload at the second time after the first time, the second event represented by at least another first predetermined amount of change in the signal from the first level in the first predetermined length of time;
    predicting a third time at which a future event in the workload is expected to occur based on a difference between the first time and the second time;
    predicting a fourth time after the third time, the fourth time corresponding to a predicted time when another future event in the workload is expected to occur based on the difference between the first time and the second time;
    selecting a subsequent monitoring time period between the third time at which the predicted future event is expected to occur and the fourth time at which said another predicted future event is expected to occur, the difference between the first time and the second time different from another difference between the third time and the fourth time;
    monitoring the workload of the electronic device during the subsequent monitoring time period; and
    controlling an amount of power supplied to the electronic device based on the frequency of the periodicity of the workload and the third time.

10. The method of claim 9, further comprising:
    detecting a third event in the workload represented by at least a second predetermined amount of change in the signal to the first level from a second level in a second predetermined length of time.

11. The method of claim 9, further comprising:
    producing a monitoring trace representing a history of the signal,
    wherein the first event and the second event are detected using the monitoring trace.

12. The method of claim 9, further comprising:
    skipping monitoring one or more events of the electronic device occurring between the monitoring time period and the selected subsequent monitoring time period.

13. A non-transitory computer readable medium configured to store program code, the program code comprising instructions when executed by a processor cause the processor to:
- monitor, during a monitoring time period between a first time and a second time, a workload of an electronic device to generate a signal indicative of the workload;
- determine a frequency of a periodicity of the workload based on the signal;
- detect a first event in the workload at the first time, the first event represented by at least a first predetermined amount of change in the signal from a first level in a first predetermined length of time;
- detect a second event in the workload at the second time after the first time, the second event represented by at least another first predetermined amount of change in the signal from the first level in the first predetermined length of time;
- predict a third time at which a future event in the workload is expected to occur based on a difference between the first time and the second time;
- predict a fourth time after the third time, the fourth time corresponding to a predicted time when another future event in the workload is expected to occur based on the difference between the first time and the second time;
- select a subsequent monitoring time period between the third time at which the predicted future event is expected to occur and the fourth time at which said another predicted future event is expected to occur, the difference between the first time and the second time different from another difference between the third time and the fourth time;
- monitor the workload of the electronic device during the subsequent monitoring time period; and
- control an amount of power supplied to the electronic device based on the frequency of the periodicity of the workload and the third time.

14. The non-transitory computer readable medium of claim 13, further comprising the program code that cause the processor to:
- detect a third event in the workload represented by at least a second predetermined amount of change in the signal to the first level from a second level in a second predetermined length of time.

15. The non-transitory computer readable medium of claim 13, the program code that cause the processor to:
- skip monitoring one or more events of the electronic device occurring between the monitoring time period and the selected subsequent monitoring time period.

* * * * *